Dec. 24, 1968  H. HUCKS ET AL  3,418,025
HYDROSTATIC GUIDING ARRANGEMENT FOR SUPPORTING
BEAMS, ESPECIALLY TOOL HOLDING MEANS
ON MACHINE TOOLS
Filed May 11, 1966  2 Sheets-Sheet 1
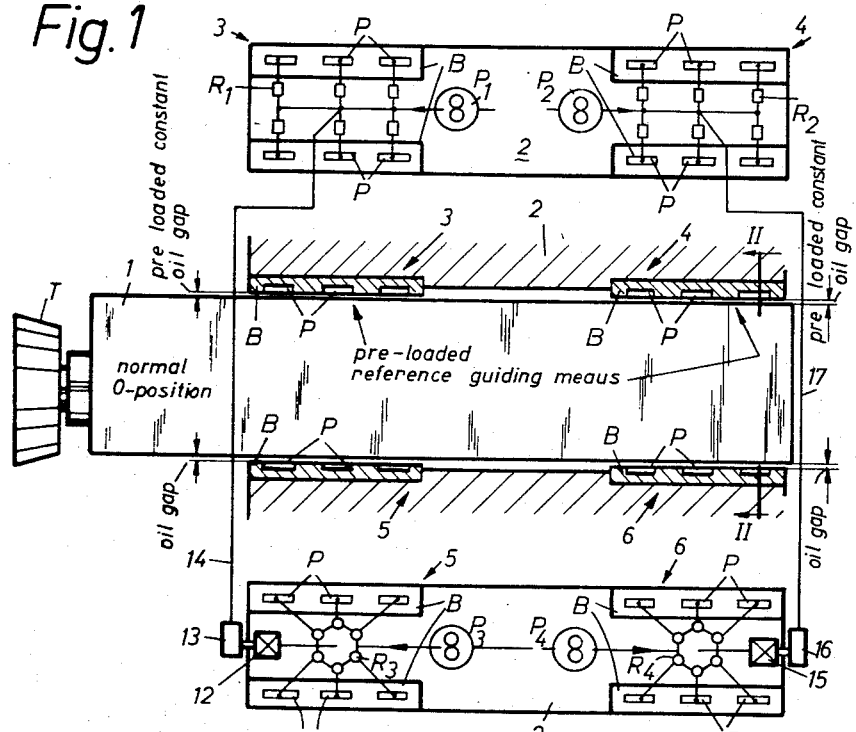
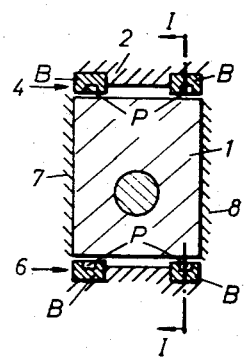
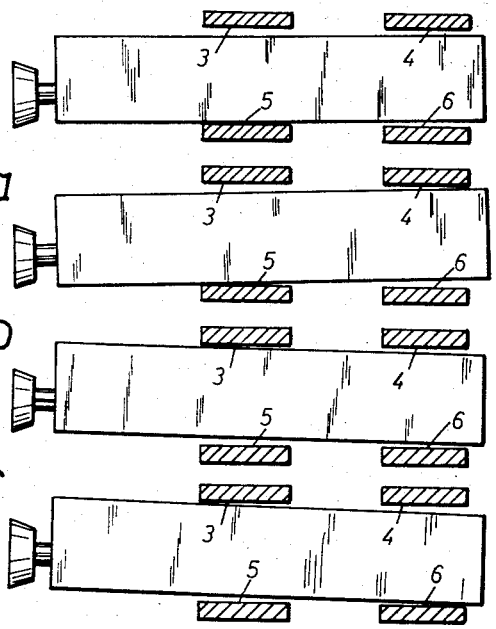
INVENTORS:
Helmut Hucks
Fritz Binder
Heinz Ludwigs
BY

United States Patent Office 3,418,025
Patented Dec. 24, 1968

3,418,025
HYDROSTATIC GUIDING ARRANGEMENT
FOR SUPPORTING BEAMS, ESPECIALLY
TOOL HOLDING MEANS ON MACHINE
TOOLS
Helmut Hucks, Monchen-Gladbach, Fritz Binder, Rheydt, and Heinz Ludwigs, Erkelenz, Rhineland, Germany, assignors to Maschinenfabrik Froriep G.m.b.H., Rheydt, Rhineland, Germany
Filed May 11, 1966, Ser. No. 549,363
Claims priority, application Germany, May 12, 1965, M 65,206
4 Claims. (Cl. 308—5)

ABSTRACT OF THE DISCLOSURE

Hydrostatic bearing and guiding arrangement for beams in which a pair of hydrostatic bearings are arranged in spaced relation to each other on opposite sides of the beam and in opposed relation with the hydraulic fluid supplied to the bearings being controllable so as to permit adjustment of the inclination of the beam.

---

The present invention relates to hydrostatic guiding means for supporting slidable slides or beams, especially tool holding beams, for machine tools, particularly supporting beams of horizontal boring mills.

With sliding parts it is desired that the difference between the frictional force during the rest position of such sliding parts and the frictional force when such sliding parts are in movement be as small as possible in order to avoid undesired jerky movements. This is indispensable particularly when numerically controlled machines with continous path control (Stetigbahnsteuerung) are involved. By reducing the friction, however, the damping of the slide bearing means is greatly reduced.

For purposes of reducing the friction, it is known to employ rolling bodies as guiding elements. Such rolling bodies, however, have the drawback that they require a relatively large space and do not permit any change in the position of the guided machine part laterally with regard to the guiding plane determined by the guiding elements. Such a change in position, however, is frequently necessary with milling machines or horizontal boring mills and cutter mills, when the tool has to be adjusted at a camber. For instance, with heavy horizontal boring mills, a great portion of the weight of the headstock is made up by the supporting beam or the telescopically interengaging displacement parts, such as supporting sleeve, boring spindle and milling spindle. These spindle supports which are displacable to a considerable extent in axial direction out of the headstock bend considerably due to their own weight so that the location of the spindle axis, or at least at the tool end thereof, is changed. In order to compensate for this changed location of the spindle axis in each displaced position of the spindle, it s necessary to place the tool at a camber in conformity with the magnitude of the displacement of the spindle axis from a predetermined theoretically connect position.

It is, therefore, an object of the present invention to provide guiding means for the supporting beams, lathe tool supports, and the like, which will have a low friction and which will permit changing the position of the guided machine part in a direction perpendicular to the guiding plane.

It is another object of this invention to provide a guiding arrangement as set forth in the preceding paragraph, which will be simple in construction and reliable in operation.

These and other objects and advantages of the invention will appear more clearly from the following specification taken in connection with the accompanying drawings, in which:

FIGURE 1 is a vertical sectional view showing a slidable supporting beam in the headstock of a horizontal boring and cutting mill, with the beam in elevation and with the headstock in section, said view indicated by line I—I on FIGURE 2.

FIGURE 2 is a sectional view indicated by line II—II on FIGURE 1.

Figure 4:
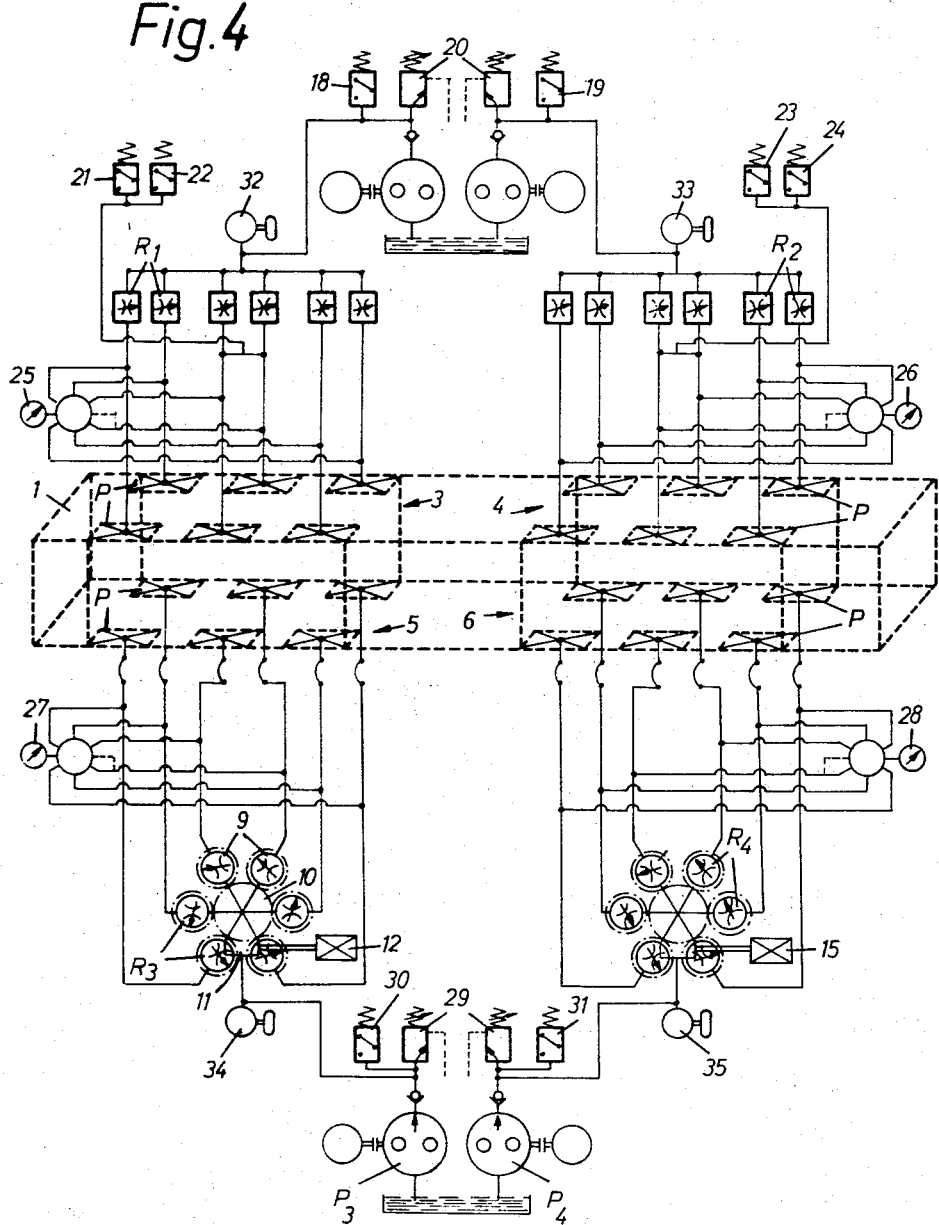

FIGURES 3, 3a, 3b, and 3c respectively illustrate various possibilities of adjusting the supporting beam at a camber.

FIGURE 4 is a schematic perspective view of the present invention showing also the hydraulic system.

The hydrostatic guiding arrangement according to the present invention for supporting slides or beams, as for instance tool supports for lathes and for the supporting beams of horizontal boring machines, is characterized in that at least one pre-loaded reference guiding means is provided in the form of a pair of spaced hydrostatic bearings having oil pockets in which, by the use of respective sources of pressure, a pressure prevails which is adjustable by a control system to a constant value or a perdetermined rated course. A guiding arrangement of this type is suitable for the supporting beam of a horizontal boring and cutting mill in vertical direction but can also be used for any other type of adjustable guiding means, as for instance for the tool supports on lathes.

According to a practical embodiment of the present invention, opposite the above mentioned hydrostatic bearings, other hydrostatic bearings are provided also having pockets and which contain a variable quantity of oil adapted to be controlled by the constant pressure in the reference guiding means. In this way, the forces acting upon the beam due to the pressure in the bearing pockets are so compensated for that the pressure will remain substantially constant in the hydrostatic bearings. The forces acting upon the beam may be cutting forces or forces due to a displacement of the weight of the beam. The preloading pressure in the reference guiding means is, therefore, selected so high that, even under extreme conditions of variation in load on the beam, no change in the beam position due to the load will occur. This constant pressure in the reference guiding means automatically yields a maximum precision.

According to a further feature of the invention, the supporting sources at both ends of the reference guiding means are arranged above and below the supporting beam and are adapted to be made effective and ineffective individually or in groups. This permits an adjustment of the camber of the cutter during a milling operation in the vertical direction. By adding or withdrawing, i.e., making effective or ineffective, a group or diagonally opposite groups of the reference guiding means, the tool can be adjusted at an incline while said adjustment can be directed downwardly or upwardly. In this way, a camber adjustment will be obtained.

By means of a pressure control in the reference guiding means, effected in conformity with the degree of extent of the beam, it is also possible to obtain a compensation for the bending or displacement of the supporting beam caused by its own weight.

Referring now more specifically to the drawings, the tool T shown therein is supported by a supporting beam, spindle, or slide 1 which latter is reciprocably mounted in head stock 2 of a horizontal boring or cutting mill. At both ends of said headstock, and which forms a reference guiding means for the beam, above and below said supporting beam 1, there are arranged supporting sources 3, 4, 5 and 6 in the form of hydrostatic guiding means or bearings. At the sides of the beam standard sliding guides generally indicated at 7 and 8 are provided.

Each hydrostatic bearing comprises a bearing block B with pockets P therein. The pockets P leave sufficient bearing area that the bearing blocks can support the beam without damage to the bearing blocks, even in the absence of pressure in the pockets.

In FIG. 1, the bearing blocks of the bearings at 3, 4, 5, and 6 are shown in plan above and below the main portion of the view so they can be oriented with the other parts of the structure.

The pockets P of blocks B of bearing 3 are supplied with oil under pressure by a pump P1 with an adjustable throttle valve R1 being connected in the line leading to each said pocket.

The pockets P of blocks B of bearing 4 are supplied with oil under pressure by pump P2 with an adjustable throttle valve R2 being connected in the line leading to each said pocket.

The pockets P of blocks B of bearing 5 are supplied with oil under pressure by a pump P3 with an adjustable throttle valve R3 being connected in the line leading to each said pocket.

The pockets P of blocks B of bearing 6 are supplied with oil under pressure by a pump P4 with an adjustable throttle valve R4 being connected in the line leading to each said pocket.

The throttle valves R1 and R2 are presettable in order to make the volume of fluid and, therefore the pressure thereof supplied to the several pockets of the bearing blocks at 3 and 4 constant and sufficiently high to sustain all loads that might be imposed on beam 1.

The adjustable throttle valves R3 and R4 pertaining to the bearing blocks at 5 and 6, however, are adapted for being adjusted in unison and by a control motor. This will be seen more clearly in FIG. 4 wherein it will be seen that the throttle valves R3 are arranged in a circular path with each thereof having a pinion 9 connected thereto. The pinions 9 all mesh with a single central gear 10. Central gear 10 is, in turn, under the control of a worm 11 mounted on the shaft of a reversible motor 12.

Returning to FIG. 2 it will be noted that a controller 13 is electrically connected with motor 12 for controlling the rotation thereof. Controller 13 is a hydroelectric unit to which pressure is supplied by way of conduit 14 leading to the discharge side of pump P1 pertaining to the bearing blocks at 3.

The adjustable throttle valves R4 pertaining to the several pockets of the bearing blocks at 6 are similarly adapted for being reversibly adjusted by reversible energization of a motor 15 associated therewith in the same manner as motor 12 is associated with throttle valves R3. Motor 15, referring again to FIG. 2, will be seen to have electrically connected thereto a controller 16 which, again is a hydroelectric unit and which is adapted for receiving pressure via conduit 17 from the discharge side of pump P2 which supplies pressure fluid to the pockets of bearing blocks at 4 which are located directly opposite the bearing blocks at 6.

FIG. 4 will show that the aforementioned controller 13 comprises at least one pressure switch at 18 whereas the aforementioned controller 16 comprises at least one pressure switch at 19. Each of pumps P1 and P2 may have a pressure relief valve 20 connected thereto for limiting the maximum pressure that can be established in the system pertaining thereto.

FIG. 4 will also reveal that pressure switches 21 and 22 may be associated with the down stream sides of throttle valves R1 while pressure switches 23 and 24 are associated with the downstream sides of throttle valves R2. These last mentioned pressure switches may form the pressure switches for the controllers 13 and 16 if so desired instead of utilizing the pressure at the discharge sides of pumps P1 and P2.

The pockets pertaining to the bearing blocks 3 and 4 are also provided with indicating gauge means at 25 and 26 respectively which are connected in such a manner as to indicate the average pressure in the said pockets.

Similarly, the pockets of the bearing blocks at 5 and 6 are provided with indicating gauges 27 and 28 connected to the pockets in the same manner so as to indicate the average pressure therein.

As will be seen in FIG. 4, pumps P3 and P4 may be provided with pressure relief valves 29 and each of these pumps may have a respective pressure switch 30, 31 for control purposes.

Each pump P1, P2, P3, and P4 has a respective selectively operable bypass valve 32, 33, 34, and 35 which can be opened to bypass the delivery of the respective pump back to the reservoir thereby completely dropping the pressure in the pockets pertaining thereto.

As will be seen in FIG. 3, the pressure in the pockets of the bearing blocks at 5 have been dropped by opening valve 34. In FIG. 3a the pressure in the bearing blocks at 4 and 5 both have been dropped and this is done by opening valves 33 and 34.

In FIG. 3b the pressure has been dropped in the pockets of the bearing blocks at 3 and this is accomplished by opening valve 32.

In FIG. 3c the pressure has been dropped in the pockets of the bearing blocks at 3 and 6 and this is accomplished by opening both of the valves 32 and 35.

It will be seen that the slide or beam tilts downwardly to a first degree in FIG. 3 and to a greater degree in FIG. 3a and tilts upwardly to a first degree in FIG. 3b and to a greater degree in FIG. 3c.

By selecting the number of hydrostatic bearings to be effective and to be made ineffective the beam can be caused to occupy any of five preselected positions, including the position not shown in FIGS. 3, 3a, 3b, and 3c but which is, instead, shown in FIG. 1 and wherein all of the pockets of the several bearing blocks are supplied with pressure.

With regard to the controls effected by motors 12 and 15, particularly where the controllers 13 and 16 therefore are sensitive to pressures on the downstream sides of throttle valves R1 and R2, the said control effected by the motors can be utilized for continuously controlling the position of the beam relative to the axis on which it is supposed to reciprocate.

For example, if beam 1 tends to drop downwardly at its left end, as viewed in FIG. 2, the clearance through which oil can escape from the pockets pertaining to the bearing blocks at 3 will increase and the amount of leakage oil will thereby increase and this will produce a pressure drop in the hydraulic system leading to the said pockets, particularly on the downstream side of the throttle valves R1. This drop in pressure can be employed for influencing one or the other of pressure switches 21 and 22 which, through controller 13 and motor 12, can be availed of for adjusting throttle valves R3 in such a direction as to increase the flow of hydraulic fluid to the pockets pertaining to the bearing blocks 5 and which will, in turn, urge beam 1 back upwardly toward the position which it is intended to occupy.

Similarly, if beam 1 at its left end, as viewed in FIG. 2 were to move upwardly, the opposite effect would be had and the pressure in the hydraulic system leading to the pockets of the bearing blocks at 3 would increase and this would be utilized to bring about a corresponding decrease in the pressure of the pockets of the bearing blocks at 5 by adjusting throttle valves toward closed position thereby again to restore the beam to its proper position.

A similar effect would be obtained at the right end of the beam as viewed in FIG. 2. Thus, a preferred manner for the control of motors 12 and 15 would be to cause the respective motors to adjust their respective throttle valves toward closed positions in response to increasing pressure in the pockets of the opposite bearing blocks and to open the said throttle valves in response to a drop in pressure in the opposing pockets.

It will be understood that this invention is susceptible to modification in order to adapt it to different usages and conditions; and accordingly, it is desired to comprehend such modification within this invention as may fall within the scope of the appended claims.

What we claim is:

1. A hydrostatic supporting and guiding system for a reciprocable beam, especially for the reciprocable tool supporting beam of a horizontal boring mill, comprising; a support member, a support beam reciprocable in said support member, a pair of first hydrostatic bearing means arranged in longitudinally spaced relation in said supporting member and disposed above said beam with small clearance therefrom, a pair of second hydrostatic bearing means in said supporting member and longitudinally spaced along said beam at the bottom thereof and arranged in respective opposed relation to said first mentioned hydrostatic bearing means and also having small clearance from the beam, each hydrostatic bearing means comprising bearing block means and pocket means therein, respective substantially constant pressure sources supplying oil to the pocket means of each bearing means, flow controlling means serially connected between each said source and the said pocket means supplied thereby, said beam tilting and slidingly to engage a said bearing block means in the absence of pressure in the pertaining pocket means and being supported in spaced relation to a said bearing block means when oil under pressure is supplied to the pertaining pocket means, motor means adjusting the said flow controlling means pertaining to each of the said second bearing means in unison, and control means connected to each said motor means in controlling relation thereto and sensitive to the pressure in the pocket means of the said first bearing means which is opposed to the respective said second bearing means for causing said motor means to adjust the respective flow controlling means and thereby vary the rate of oil supply to the said pocket means in series therewith.

2. A hydrostatic guiding and supporting system according to claim 1 in which said flow controlling means comprises an adjustable throttle valve, each motor means comprising an electric motor, each said control means comprising an electric controller, and limit switch means connected to each controller and sensitive to the pressure in the pocket means of the said first bearing means which is opposed to the said second bearing means pertaining to the said controller.

3. A hydrostatic guiding and supporting system according to claim 2 in which said respective sources are in the form of a respective pump for each bearing means, and valve means for selectively diverting the supply of fluid from each pump to its respective bearing means to tilt said beam in the vertical direction.

4. A hydrostatic guiding and supporting system according to claim 3 in which said valve means comprises a normally closed valve between each pump and exhaust, each valve being independently operable to permit said bearing means to be made ineffective individually or according to any selected grouping thereof.

References Cited

UNITED STATES PATENTS

| | | | |
|---|---|---|---|
| 3,260,162 | 7/1966 | Atherton. | |
| 1,499,332 | 7/1924 | Baumann | 308—9 |
| 2,663,977 | 12/1953 | Gerard | 308—122 |
| 2,692,803 | 10/1954 | Gerard | 308—9 |
| 2,879,113 | 3/1959 | De Hart | 308—122 |
| 3,109,514 | 11/1963 | Deflandre. | |
| 3,126,233 | 3/1964 | Royle | 308—122 |
| 3,205,587 | 9/1965 | Kilburn | 308—5 |
| 3,266,854 | 8/1966 | Aller | 308—5 |
| 3,231,320 | 1/1966 | Krafft | 308—5 |
| 3,271,086 | 9/1966 | Deffrenne | 308—5 |

FOREIGN PATENTS

| | | |
|---|---|---|
| 1,266,160 | 12/1961 | France. |
| 1,306,264 | 12/1962 | France. |
| 876,171 | 8/1961 | Great Britain. |

MARTIN P. SCHWADRON, *Primary Examiner.*

L. L. JOHNSON, *Assistant Examiner.*